US006456847B1

United States Patent
Lilja et al.

(10) Patent No.: US 6,456,847 B1
(45) Date of Patent: Sep. 24, 2002

(54) TIMING OF HANDOVER

(75) Inventors: Harri Lilja, Oulu; Seppo Hämäläinen, Espoo, both of (FI); Kari Pehkonen, Tokyo (JP)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/457,918

(22) Filed: Dec. 9, 1999

(30) Foreign Application Priority Data

Dec. 11, 1998 (FI) .................................................. 982690

(51) Int. Cl.⁷ ................................................. H04Q 7/20
(52) U.S. Cl. ........................ 455/437; 455/436; 455/439; 455/440
(58) Field of Search ................................ 455/436–437, 455/434, 444, 439–440, 438, 441, 442, 432, 445, 67.1, 68, 33.2, 33.1, 33.3, 33.4, 54.1, 56.1, 161.1, 101.3, 226.2, 513, 515, 443; 370/331–33, 321

(56) References Cited

U.S. PATENT DOCUMENTS

| 5,903,840 A | * | 5/1999 | Bertacchi ..................... 370/332 |
| 5,999,816 A | * | 12/1999 | Tiedemann et al. .......... 455/436 |
| 6,181,943 B1 | * | 1/2001 | Kuo et al. .................... 455/437 |

FOREIGN PATENT DOCUMENTS

| EP | 0948231 A2 | 10/1999 |
| EP | 0955781 A2 | 11/1999 |
| EP | 0966173 A1 | 12/1999 |
| EP | 0981256 A2 | 2/2000 |
| GB | 2314734 A | 7/1998 |
| WO | WO 97/26770 | 7/1997 |
| WO | WO 98/36607 | 8/1998 |

OTHER PUBLICATIONS

"The ETSI UMTS Terrestrial Radio Access (UTRA) ITU–R RTT Candidate Submission", Tdoc SMG2 260/98.

* cited by examiner

Primary Examiner—Daniel Hunter
Assistant Examiner—Pablo Tran
(74) Attorney, Agent, or Firm—Perman & Green, LLP (57) ABSTRACT

The invention relates to a radio system and a method of timing an interfrequency handover in a WCDMA cellular radio system where data transmission between a terminal equipment and a base station employs several adjacent alternative frequency bands, and which comprises several different base stations the coverage areas of which overlap at least partly, the base stations utilizing frequency band groups that differ from one another and that are situated next to one another in the frequency range, in which system a terminal equipment communicates with a first base station on a first frequency band and measures the strength of a first signal it has received from the base station, and wherein the terminal equipment measures the strength of a second signal transmitted by a second base station on a second, adjacent frequency band. In order to perform a handover at a correct moment, the terminal equipment compares the measurement results of the first and the second signal, and if the second signal exceeds the first signal by a given threshold value, the terminal equipment signals a handover request to the first base station.

15 Claims, 7 Drawing Sheets

TIMING OF HANDOVER

FIELD OF THE INVENTION

The invention relates to a method of timing an interfrequency handover in a cellular radio system. The invention relates particularly to a system where data transmission between a terminal equipment and a base station employs several adjacent alternative frequency bands, and which system comprises several different base stations the coverage areas of which overlap at least partly, the base stations utilizing frequency band groups that differ from one another and that are situated next to one another in the frequency range.

BACKGROUND OF THE INVENTION

In radio systems a signal to be transmitted has to be usually modulated for data transmission on a transmission channel. The modulation is generally carried out by digital modulation methods which are used to transmit a desired signal on a given frequency band. Digital modulation methods where the envelope is not constant are often used. With such modulation methods, if the transmitter is not linear there will be interference outside the frequency band allocated for signal transmission, such interference being called adjacent channel interference. This interference is mainly due to nonlinearities of the transmitter. Nonlinearity of the transmitter is closely related to end amplifier power efficiency of the transmitter. Linear amplifiers cause only a little interference to adjacent frequency bands, but the power efficiency of the amplifiers is low. With nonlinear amplifiers there will be more interference, whereas the capacity will be better.

When cellular radio systems are designed, the purpose is to utilize a frequency band allocated to a system as efficiently as possible. This means that there will be adjacent channel interference in actual radio networks. It is characteristic of a terminal equipment in a radio system that the receiver of the equipment must be able to attenuate even strong signals on an adjacent frequency band. However, adjacent channel attenuation (selectivity) by the receiver is always limited since too great demands lead either to distortion of the desired signal received by the terminal equipment or to excessive increase of power consumption of the terminal equipment. It is characteristic of radio systems that a certain adjacent channel attenuation value is determined for terminal equipment receivers of the system, and the receivers should attain this value. Therefore each terminal equipment knows its own ability to attenuate an adjacent channel signal.

Figure 1:
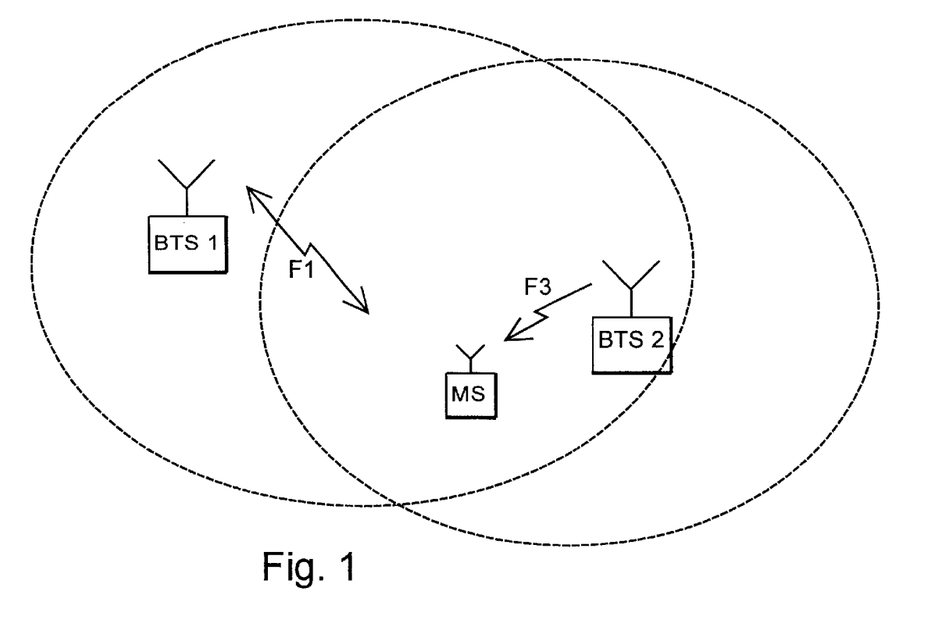
FIG. 1 shows a cellular radio system.

In some situations adjacent channel interference increases to such an extent that the connection may be disconnected. This is called blocking of a receiver. In such a situation, it is important that an interfrequency handover can be performed rapidly and at a correct moment. Examine the situation shown in FIG. 1. A terminal equipment MS communicates with a base station BTS1. Frequency F1 is used over the connection in the downlink direction (BTS→MS). However, the terminal equipment is situated close to another base station BTS2, which transmits to its own terminal equipments on frequency F3. If frequencies F1 and F3 are adjacent frequency bands on the frequency range, the transmission of the other base station BTS2 appears to the MS as adjacent channel interference, since the receiver selectivity is not ideal. Assume that BTS1 and BTS2 are, for example, base stations of different network operators, in which case the MS cannot perform a handover to BTS2. As the interference becomes stronger, there is a risk of the connection from the MS to BTS1 being disconnected.

In prior art arrangements in CDMA systems, a terminal equipment measures the strength of the signals it has received from the base stations. The purpose of the measurements is to search for handover candidates. However, these methods are not applicable in the aforementioned situation, where the other base station is located on another frequency to which the terminal equipment cannot perform a handover. In some arrangements, the interference caused by the terminal equipment's own transmission in the uplink direction (MS→BTS) to terminal equipments of another operator is estimated on the basis of signal strengths measured from base station transmissions, and this is used as a basis for a handover. However, this method does not take into account the interference to the terminal equipment's own connection, which means that the handover is not carried out in the best possible manner for the terminal equipment since the call may be blocked before the handover is completed.

BRIEF DESCRIPTION OF THE INVENTION

The purpose of the invention is to provide a method and an equipment implementing the method such that the aforementioned problems can be solved. This is achieved with a method according to the invention of timing an interfrequency handover in a WCDMA cellular radio system, where data transmission between a terminal equipment and a base station employs several adjacent alternative frequency bands, and which comprises several different base stations the coverage areas of which overlap at least partly, the base stations utilizing frequency band groups that differ from one another and that are situated next to one another in the frequency range, in which system a terminal equipment communicates with a first base station on a first frequency band and measures the strength of a first signal it has received from the base station, and wherein the terminal equipment measures the strength of a second signal transmitted by a second base station on a second, adjacent frequency band. In the method according to the invention, the terminal equipment compares the measurement results of the first and the second signal, and if the second signal exceeds the first signal by a given threshold value, the terminal equipment signals a handover request to the first base station.

The invention also relates to a cellular radio system which utilizes the WCDMA method, and where data transmission between a terminal equipment and a base station employs several adjacent alternative frequency bands, and which comprises several different base stations the coverage areas of which overlap at least partly, the base stations being arranged to utilize frequency band groups that differ from one another and that are situated next to one another in the frequency range, in which system a terminal equipment is arranged to communicate with a first base station on a first frequency band and to measure the strength of a first signal it has received from the base station and to measure the strength of a second signal transmitted by a second base station on a second, adjacent frequency band. In the system according to the invention, the terminal equipment of the system comprises means for comparing the measurement results of the first and the second signal, and means for deciding on the transmission of a handover request to the first base station if the second signal exceeds the first signal by a given threshold value.

The preferred embodiments of the invention are disclosed in the dependent claims.

The invention is based on the discovery that before the transmission of a terminal equipment interferes with the transmissions of other terminal equipments situated in the area of another base station, the terminal equipment's own connection may be disconnected when the adjacent channel interference caused by the transmission of the other base station exceeds the adjacent channel selectivity of the terminal equipment receiver.

The method and the system according to the invention provide several advantages. The moment of handover can be selected optimally by monitoring and comparing the measured signal strengths. Further, in the arrangement according to the invention it is possible to adjust the capacity used by the terminal equipment for measurements. Thus, the interference caused by the measurements to the terminal equipment's own connection can be minimized.

BRIEF DESCRIPTION OF THE FIGURES

The invention will be described below in more detail in connection with preferred embodiments and with reference to the accompanying drawings, in which.

DETAILED DESCRIPTION OF THE INVENTION

The invention will be described below in a mobile phone system utilizing a direct sequence Wideband Code Division Multiple Access (WCDMA) method. Thus, for example a model drafted by the ARIB (Association of Radio Industries and Businesses) for an IMT-2000 mobile phone system in Japan is a system according to the invention. The examples are based on the description of the WCDMA system, disclosed in more detail in the ETSI (European Telecommunications Standards Institute) specification The *ETSI UMTS Terrestrial Radio Access* (UTRA) ITU-R RTT *Candidate Submission* (Tdoc SMG2 260/98, May/June 1998), which is incorporated herein by reference.

The structure of a mobile phone system according to the invention used as an example will be described with reference to FIG. 2. The main parts of the mobile phone system include a core network CN, a UMTS terrestrial radio access network UTRAN and a user equipment UE. The interface between the CN and the UTRAN is called Iu and the air interface between the UTRAN and the UE is called Uu.

A radio access network consists of radio network subsystems RNS. The interface between the subsystems is called Iur. Each RNS consists of a radio network controller RNC and one or several B-nodes. The interface between the RNC and the B-node is called Iub. The coverage area or cell of the B-node is denoted by C in FIG. 2.

Figure 2:
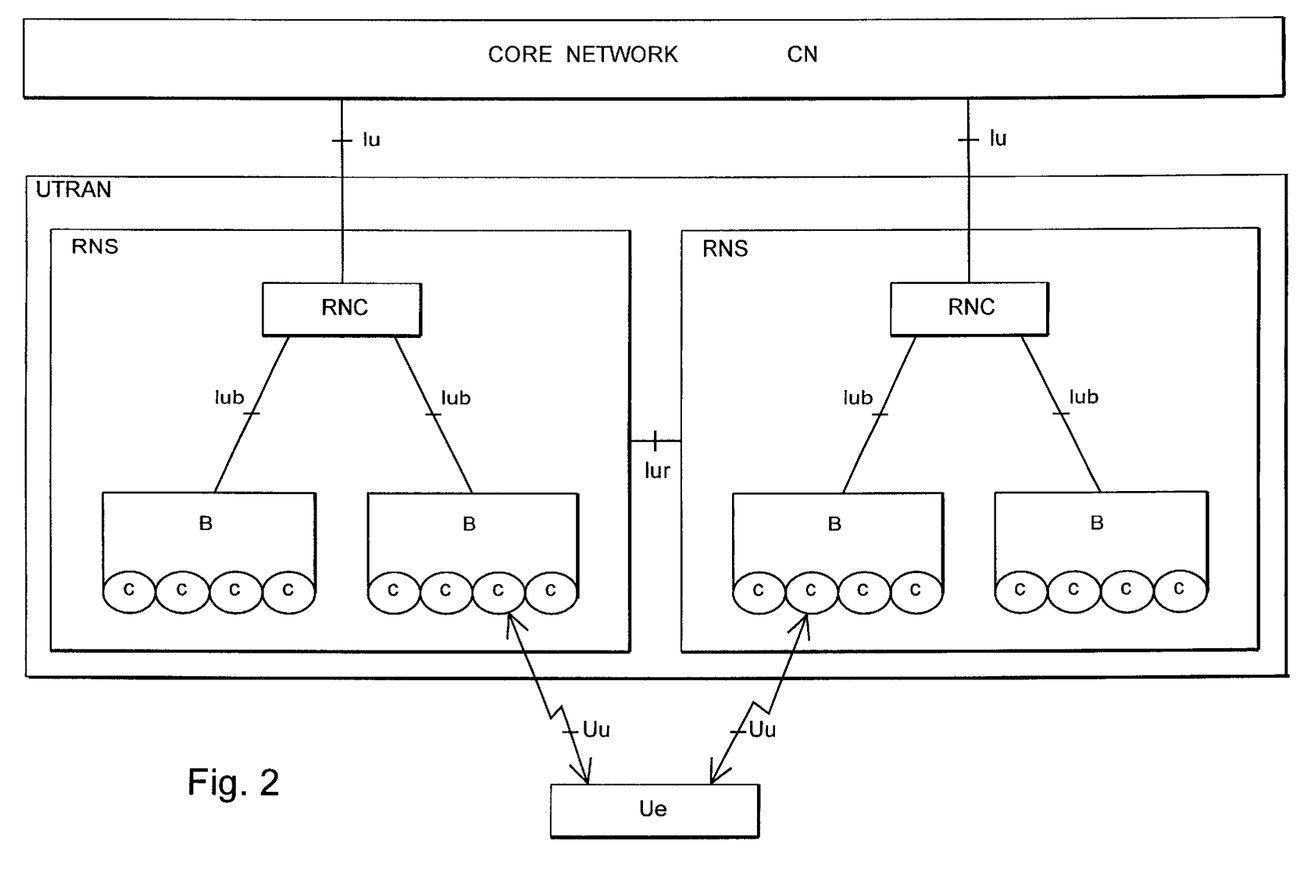
FIG. 2 shows the structure of a cellular radio system used as an example.
Figure 3:
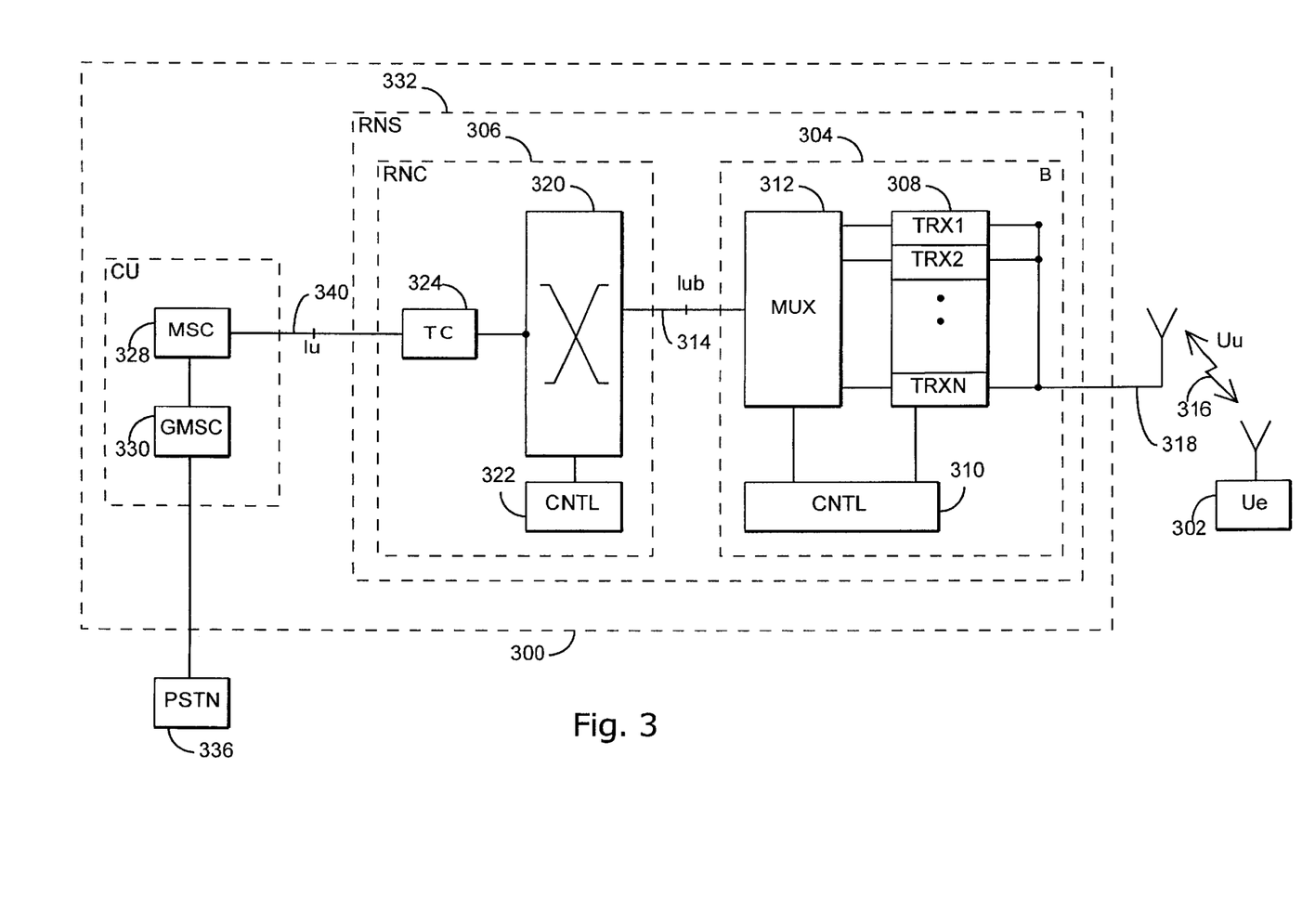
FIG. 3 illustrates, in more detail, the structure of the exemplary cellular radio system.

The description in FIG. 2 is rather general and it will be clarified with a more detailed example of a cellular radio system shown in FIG. 3. FIG. 3 shows only the essential blocks, but it is clear for a person skilled in the art that a conventional cellular radio network also comprises other functions and structures that do not need to be described in more detail herein. It should also be noted that FIG. 3 shows only one possible structure. For example, in the aforementioned systems developed by the ARIB and the ETSI the details may differ from those shown in FIG. 3, but such differences are not essential to the invention.

A cellular radio network typically comprises a similar infrastructure as a fixed network, which means a network element 300 and subscriber terminals 302. which may be fixed or portable terminal equipments or which may be located in a vehicle. The network element 300 comprises base stations 304. A base station corresponds to the B-node shown in FIG. 2. Several base stations 304 are controlled in a centralized manner by a radio network controller 306 communicating with the base stations. A base station 304 comprises transceivers 308 and a multiplexer unit 312.

The base station 304 further comprises a control unit 310, which controls the operation of the transceivers 308 and the multiplexer 312. The multiplexer 312 combines traffic and control channels used by several transceivers 308 onto a single transmission link 314. The transmission link 314 constitutes an interface Iub.

The transceivers 308 of the base station 304 are connected to an antenna unit 318, which provides a bidirectional radio link 316 to the subscriber terminal 302. The structure of the frames transmitted over the bidirectional radio link 316 is defined specifically in each system and it is called an air interface Uu.

The radio network controller 306 comprises a group switching field 320 and a control unit 322. The group switching field 320 is used for connecting speech and data and for combining signalling circuits. The radio network subsystem 332 formed by the base station 304 and the RNC 306 also comprises a transcoder 324. The transcoder 324 is usually situated as close to a mobile switching centre MSC 328 as possible, since speech can then be transmitted between the transcoder 324 and the RNC 306 in the same form as in the cellular radio network, saving thus transmission capacity.

The transcoder 324 adapts the different digital speech coding modes used between the public switched telephone network and the radio phone network to suit each other, for example it converts the coding from a fixed-network mode to a mode of the cellular radio network, and vice versa. The control unit 322 performs call control, mobility management, gathering of statistical data, and signalling.

The core network CN consists of the infrastructure of the mobile phone system that is not a part of the radio access network. From the equipment of the core network, FIG. 3 shows the MSC 328 and a gateway MSC 330 which controls connections from the mobile phone system to the outside world, in this case to a public switched telephone network 336. An interface 340 between the CN and the radio access network is called Iu.

Figure 4A:
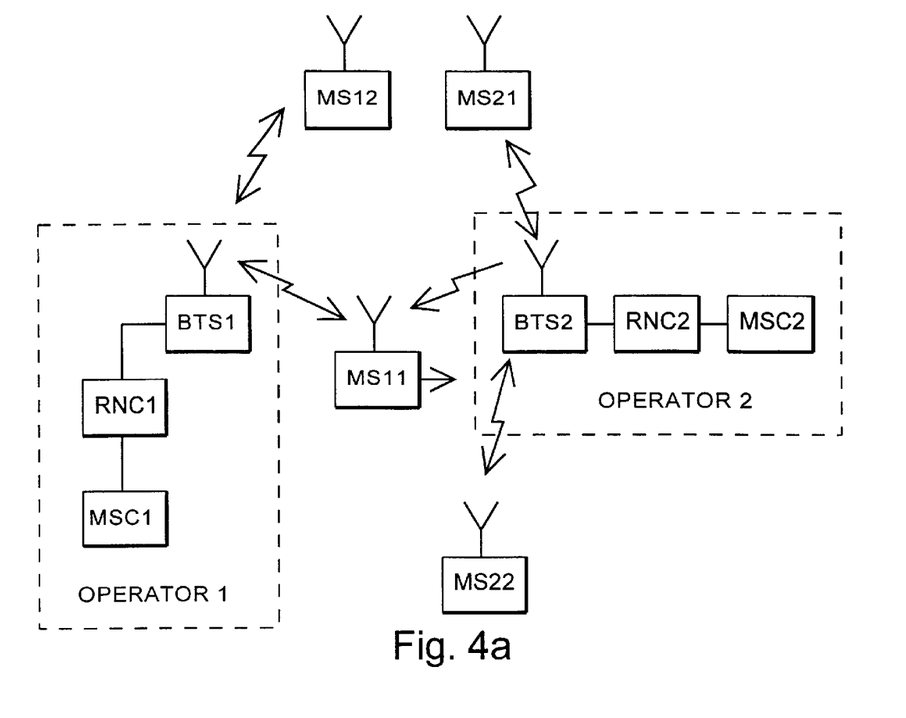
FIG. 4a shows an example of a two-operator network.

Examine below the situation shown in FIG. 4a, illustrating a part of a two-operator network. From the system of operator 1 the figure shows a base station BTS1, which is controlled by a radio network controller RNC1. The radio network controller is connected to a mobile switching centre MSC1. The base station BTS1 of operator 1 communicates with terminal equipments MS11 and MS12. Correspondingly, from the system of operator 2 the figure shows a base station BTS2, which is controlled by a radio network controller RNC2. The radio network controller is connected to a mobile switching centre MSC2. The base station BTS2 of operator 2 communicates with terminal equipments MS21 and MS22. Each network naturally comprises also other components, but for the sake of clarity they are not shown in this example. The operators operate independently of one another, and the coverage areas of the base stations BTS1 and BTS2 overlap at least partly.

Figure 4B:
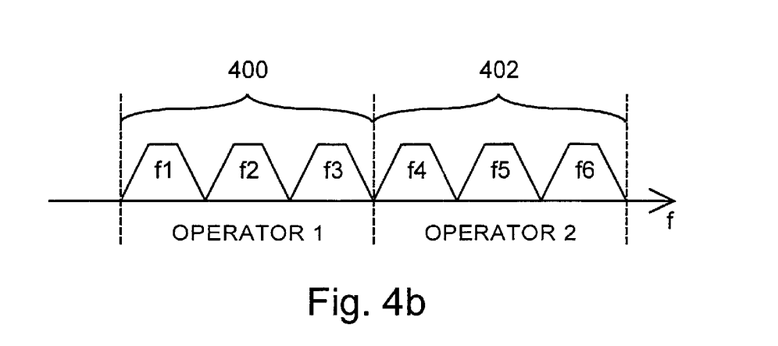
FIG. 4b shows an example of allocating frequency bands to two operators.

FIG. 4b illustrates frequency bands allocated to the operators. To operator 1 is allocated a frequency range 400 comprising frequency bands F1, F2 and F3. To operator 2 is allocated a frequency range 402 comprising frequency bands F4, F5 and F6. The frequency bands are located such that F3 and F4 are adjacent frequency bands. Therefore, these bands cause adjacent channel interference to each other. It should be noted that FIG. 4b shows only the frequency bands of the downlink transmission direction (BTS→MS). The frequency bands of the uplink direction are situated correspondingly adjacent to one another on the frequency range, separated from the downlink frequencies by the duplex spacing.

Assume that the terminal. equipment MS11 communicating with the base station BTS1 of operator 1 uses frequency band F3 and is moving towards the base station BTS2 of operator 2. When adjacent channel measurement is to be activated, BTS1 transmits to MS11 a measurement activation command comprising data about the frequency the terminal equipment should measure and the desired frequency of measurement. Data about threshold values can also be signalled to the terminal equipment. The use of threshold values will be described below.

Figure 5A:
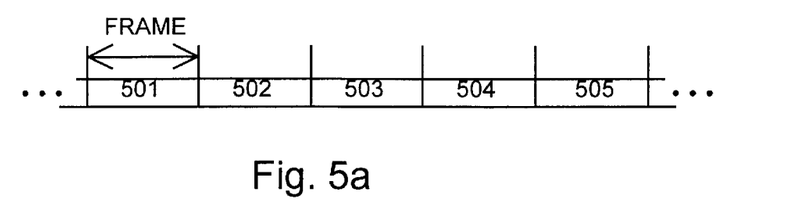
FIGS. 5a to 5c illustrate different transmission modes of a terminal equipment.
Figure 5B:
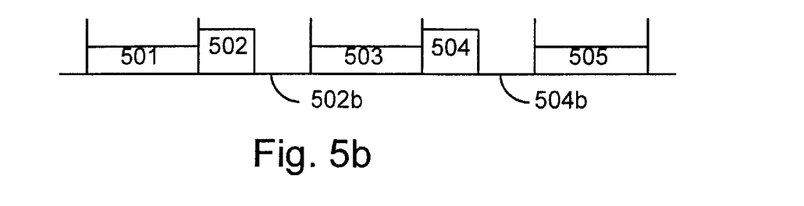

Examine one alternative manner of performing measurements in a system according to the invention. FIG. 5a illustrates a normal transmission mode of a terminal equipment where the terminal equipment continuously receives in successive frames 501–505. In the system according to the invention, a base station may command a terminal equipment to change to a compressed or slofted mode. This is illustrated in FIG. 5b. In such a case, the base station transmits and the terminal equipment correspondingly receives a frame at times in a compressed mode, in other words in a shorter time than normally. In FIG. 5b, frames 502 and 504 are compressed. This means that in these frames in time slots 502b and 504b the terminal equipment has idle time to carry out adjacent channel measurements. A terminal equipment may also transmit to the base station in the compressed mode.

The compressed mode can be implemented in the WCDMA system for example by changing the spreading factor, by increasing the code ratio, by using several parallel codes or by changing the modulation method, or by means of a combination of the former methods. A compressed frame can be transmitted at a greater transmission power than an uncompressed frame. The compressed mode is described in more detail in the aforementioned ETSI document, in item 5.5.4.2.1.1 "Slotted mode".

Figure 6A:
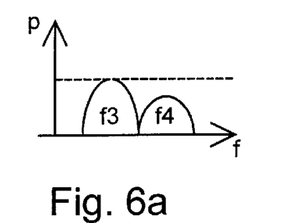
FIGS. 6a to 6c show measurements carried out by the terminal equipment.
Figure 6B:
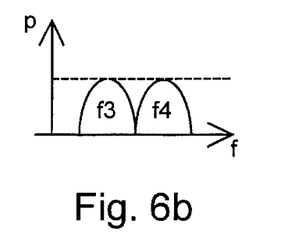

Examine again the situation shown in FIG. 4a. The terminal equipment MS11 performs adjacent channel measurements and compares the signal strength to the signal strength of its own base station. When the terminal equipment is situated far from the base station BTS2 of another operator, the measurement results may be as shown in FIG. 6a, for example. FIG. 6a shows in parallel the signal strength of the terminal equipment's own base station BTS1, which is on frequency F3, and the signal strength of another base station BTS2, which is on frequency F4. The vertical axis shows the power. The signal from the terminal equipment's own base station is stronger than the signal from the other base station. When the terminal equipment MS11 moves closer to the base station BTS2, the signal strength of this base station increases, whereafter the situation may be as shown in FIG. 6b. The signal strengths of both base stations are then equal.

Figure 5C:
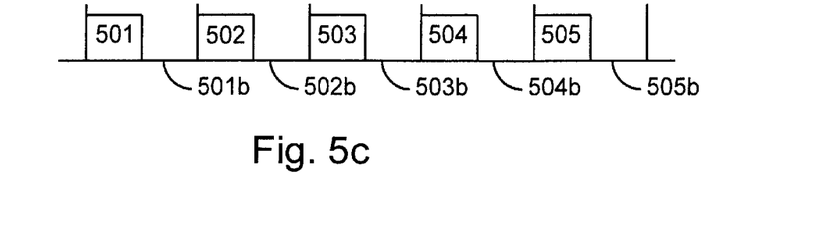

In a preferred embodiment of the invention, the terminal equipment requests the base station to adjust the measurement intervals on the basis of comparison of signal measurement results. In the situation of FIG. 6b, when the terminal equipment MS11 detects that the signal strengths are equal, it requests for more measurement time from the base station BTS1, in other words it requests that the number of the compressed frames be increased. The base station may transmit to the terminal equipment a command to change the compression mode for example to correspond to the one shown in FIG. 5c. In FIG. 5c, all the frames 501–505 are compressed. In such frames the terminal equipment will have idle time 501b–505b to carry out adjacent channel measurements. It is thus possible to monitor adjacent channel interference more closely and to react to changes more rapidly than previously.

In the example described above, when the terminal equipment detects that the signal strengths are equal, it requests the base station to adjust the measurement intervals. In a preferred embodiment of the invention, a threshold value is determined for the ratio between the signal strengths of an adjacent channel and the terminal equipment's own channel, and the base station signals this value to the terminal equipment. The value can be signalled to the terminal equipment together with a command to start conducting measurements. When the power of the adjacent channel reaches the given threshold value, the terminal equipment requests for adjustment of the measurement intervals.

Even though the strength of the interfering signal equals the strength of the desired signal in the situation shown in FIG. 6b, the connection is not yet at a risk of being disconnected since the interference is on the adjacent frequency, wherefore it can be decreased by filtering at the receiver. Also, the processing gain in the WCDMA method ensures a connection of good quality even in a situation with interference.

If the terminal equipment MS11 changes its direction of movement and the signal strength of the other base station BTS2 deteriorates, the number of measurement intervals can be decreased.

Figure 6C:
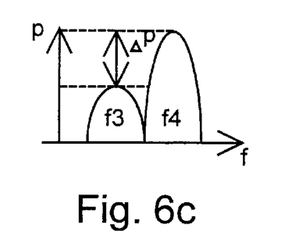

Assume in this example, however, that the terminal equipment MS11 continues moving towards the base station BTS2. When the terminal equipment compares the measurement results it soon detects that the signal from the other base station BTS2 exceeds in strength the signal from its own base station BTS1 by a certain threshold $\Delta P$. The situation is as shown in FIG. 6c. In this situation, the connection quality is already at a risk since the adjacent channel signal is so strong that the adjacent channel selectivity of the receiver is no longer sufficient. The system specifications thus determine the ratio of adjacent channel interference to the power of the received desired signal the terminal equipments in the system must be able to tolerate without a risk of the connection being disconnected. Therefore the threshold ΔP can be determined such that a handover is activated before the connection is disconnected. In a preferred embodiment of the invention, the threshold ΔP has a value which is smaller than or equal to the maximum value of the adjacent channel interference determined for the terminal equipments in the system. For example, if the maximum adjacent channel interference value is 30 dB, the threshold value can be 20 dB. This value can be determined by the system operator.

When the terminal equipment MS11 detects a situation as shown in FIG. 6c, it signals to its own base station BTS1 a handover request in order to change the frequency of the connection between the terminal equipment and the base station from F3 to some other frequency used by BTS1 but not by BTS2. In this example, possible frequencies are F2 and F1, which are not adjacent to the frequency range used by operator 2.

After the base station BTS1 has received the handover request from the terminal equipment MS11, it activates a handover operation in order to change the connection of the terminal equipment to another frequency employed by the base station BTS1. When the handover has been completed, the base station BTS2 no longer causes interference to the terminal equipment even if it is situated close by, since the frequency band used by the terminal equipment differs sufficiently from the frequencies used by the base station BTS2, which results in improved receiver selectivity. For the present invention, it is not essential how the handover is carried out.

Examine how the terminal equipment is guided to carry out adjacent channel measurements. There are different alternative manners from which the network operator may select a suitable one. Examine here FIG. 4b and the frequency bands allocated to operator 1. One alternative manner is that all the terminal equipments using a frequency band that is adjacent to a band used by another operator, such as the terminal equipments employing frequency F3 in FIG. 4b, measure at times the adjacent channel interference from frequency F4. This means that at times the terminal equipments change to the compressed mode. This measurement interval may be constant. In a preferred embodiment of the invention, the measurement interval is adjusted on the basis of the measurement results, as described above. Another alternative is that measurements are only carried out in areas where adjacent channel interference is known to occur. For example in cells where there are base stations of another operator employing an adjacent frequency band, the base station commands the terminal equipments to carry out measurements. The measurement procedure can also be activated on the basis of a preset criterion. For example, if the average connection quality (such as the BER) deteriorates or if the average transmission power of the base station becomes too high, it can be concluded that there is interference, in which case the terminal equipments are activated to measure the adjacent channel interference.

Figure 7A:
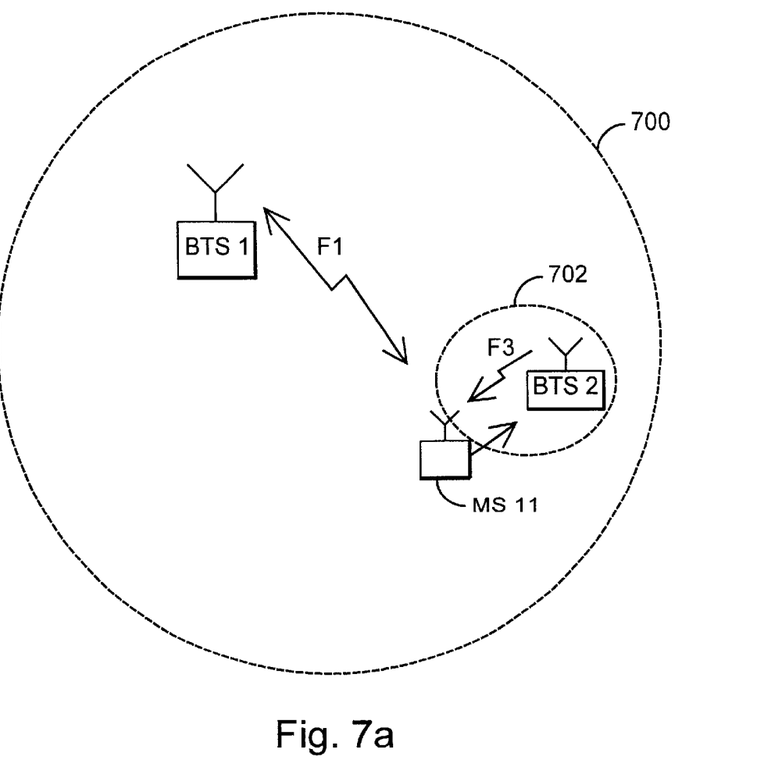
FIG. 7a shows an example of a system with a hierarchical cell structure.

Examine below another type of system where the invention can be applied. FIG. 7a shows an example of a system with a hierarchical cell structure. A hierarchical cell structure HCS refers to a system comprising both macrocells covering a large area and microcells situated within the macrocells. In such a system, for example fast moving terminal equipments usually communicate with a macrocell and slowly moving or stationary terminal equipments communicate with a microcell. Microcells can also be placed in areas with a high traffic load. The example of FIG. 7a shows a first base station BTS1 the coverage area 700 of which is a macrocell.

A terminal equipment MS11 communicates with the base station BTS1. Within the coverage area 700 there is a second base station BTS2, which services a microcell 702. In this example, the first base station employs frequency bands F1 and F2 and the second base station for example frequency F3, with reference to FIG. 4b. Assume that the terminal equipment MS11 is moving towards the base station BTS2. In such a case, with respect to adjacent channel interference the situation is as described above in connection with FIG. 4a, and the invention can be applied in a similar manner. The only difference is that now the adjacent channel is another frequency band of the same operator and not a frequency band of a different operator. However, this makes no difference for the measurements. Terminal equipment measurements can also be carried out correspondingly by means of different alternatives, as described above.

Figure 7B:
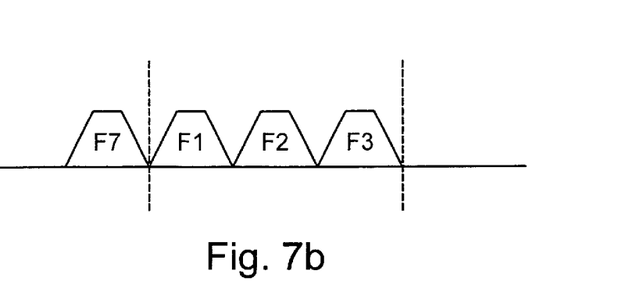
FIGS. 7b and 7c illustrate examples of different embodiments of the invention.

Examine next a different type of situation where the invention can also be applied. FIG. 7b illustrates an example where frequencies F1 to F3 are allocated to a system for WCDMA use, such that these frequencies are used in the downlink direction. The frequencies allocated to the uplink direction are separated from the downlink frequencies by a given duplex spacing (not shown in the figure). Adjacent to the frequency range allocated to the system there may be a frequency band allocated to another network, for example in FIG. 7b frequency band F7, which is next to F1. Frequency band F7 is employed by TDD mode data transmission, which means that both uplink and downlink traffic is transmitted on this band. Between these two frequency bands there may also be interference, as described above. In a preferred embodiment of the invention, terminal equipments using frequency F1 can be guided to measure adjacent channel interference from frequency F7.

Figure 7C:
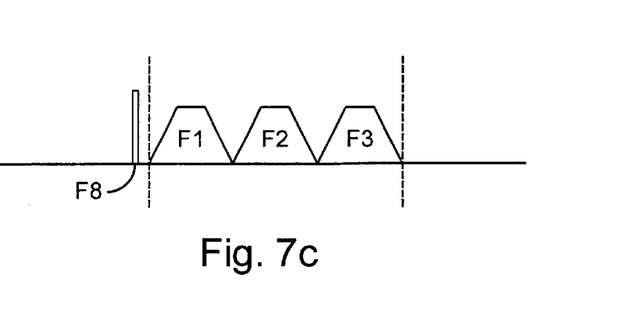

FIG. 7c illustrates a situation where frequency band F1 is adjacent to a frequency F8 allocated for narrowband traffic. This may be, for example, a network employing either the TDMA or the FDMA method. Terminal equipments using frequency F1 can be guided to measure adjacent channel interference from frequency F8, if the base station is aware of this frequency. However, this requires a narrowband filter in the receiver. This will be described below in connection with the structure of the receiver. If the exact frequency is not known, the terminal equipments can be guided to perform measurements from several frequencies.

Figure 8:
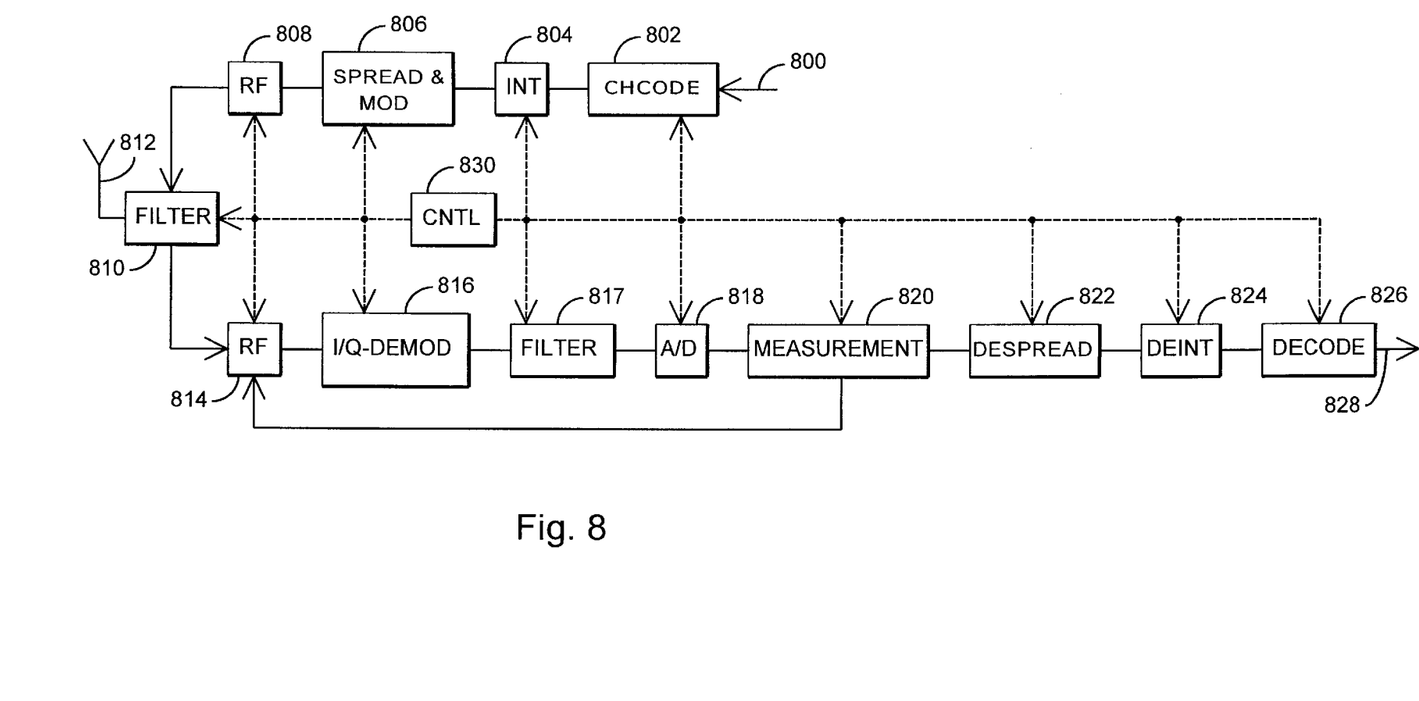
FIG. 8 illustrates a first example of a terminal equipment in a system according to the invention.

FIG. 8 shows an example of a structure of a terminal equipment according to the invention. The structure is simplified and it only shows the essential blocks, as it is evident for a person skilled in the art.

Examine first the structure of the transmitting end. A signal to be transmitted, which has been subjected to some form of source coding, such as speech coding, is supplied to a channel coder 802. Channel coding includes, for example, different block codes, such as cyclic redundancy check CRC. Other typically used methods include convolutional coding and different modifications thereof, such as punctured convolutional coding and turbo coding.

The coded signal is further supplied to an interleaver 804. The purpose of interleaving is to facilitate error correction. As a result, a momentary fading over the radio path does not necessarily make the transmitted information impossible to identify. The signal is then spread by a spreading code, mixed with a mixing code, modulated in a modulator 806 and supplied to radio-frequency parts 808, which may comprise different power amplifiers and filters restricting the bandwidth. The analogue radio signal is transmitted via a duplex filter 810 and an antenna 812 to the radio path.

Examine next the structure of the receiving end. A radio receiver in a CDMA system is typically, but not necessarily, a rake receiver. An analogue RF signal is received from the radio path by an antenna 812. The signal is supplied via a duplex filter 810 to radio-frequency parts 814, which comprise a filter that blocks frequencies outside the desired frequency band. The signal is thereafter converted in an I/Q demodulator 816 into a baseband, and the signal is supplied in this form to a filter 817, which further attenuates the adjacent channels. The filter 817 preferably consists of I and Q low-pass filters. After the filter, the signal is sampled and quantized in an A/D converter 818. The signal strength is thereafter measured in measuring means 820. It is possible to employ prior art measuring means. When the measuring means measure the desired signal, the automatic gain control of the radio-frequency parts can be controlled on the basis of the measurement result, thus keeping the signal level suitable for the A/D converter.

Since the signal is a multipath-propagated signal, the signal components that have propagated along different paths are thereafter combined in a block 822 comprising several rake branches in accordance with known technology. The signal components received by the rake branches at different delays are located through correlation of the received signal with the used spreading codes, which have been delayed by predetermined delays. When the delays of the signal components have been located, the signal components belonging to the same signal are combined. The spreading coding of the signal components is simultaneously decoded by multiplying the signal by the spreading code of the physical channel.

The obtained narrowband signal is supplied to a deinterleaver 824 where the deinterleaving is carried out, corresponding to the interleaving performed in the interleaver of the transmitter. The signal is then supplied to a decoder 826, where the channel coding, such as block coding and convolutional coding, used in the transmission is decoded. Convolutional coding is preferably decoded by a Viterbi decoder. The decoded signal 828 is supplied to other parts of the receiver.

The operation of different parts of a terminal equipment is controlled by control logic 830, which is typically realized by a processor and suitable software, logic circuits or an ASIC. Guided by the control logic, the terminal equipment is arranged to measure with the measuring means 820 not only the signal strength of the signal transmitted by its own base station but also the signal strength of another base station transmitting on an adjacent frequency band, as described above. In the control logic, the signal measurement results are compared, and a decision is made concerning the transmission of a handover request to the terminal equipment's own base station if the signal from the other base station exceeds in strength the signal from the terminal equipment's own base station by a given threshold.

Examine the situation shown in FIG. 7c, where frequency F8 allocated for narrowband traffic is adjacent to frequency F1. Performing measurements in such a situation requires a narrowband filter in the receiver. The narrowband feature can be implemented preferably for example by adjusting the cutoff frequency of the filter 817 to a suitable level.

Figure 9:
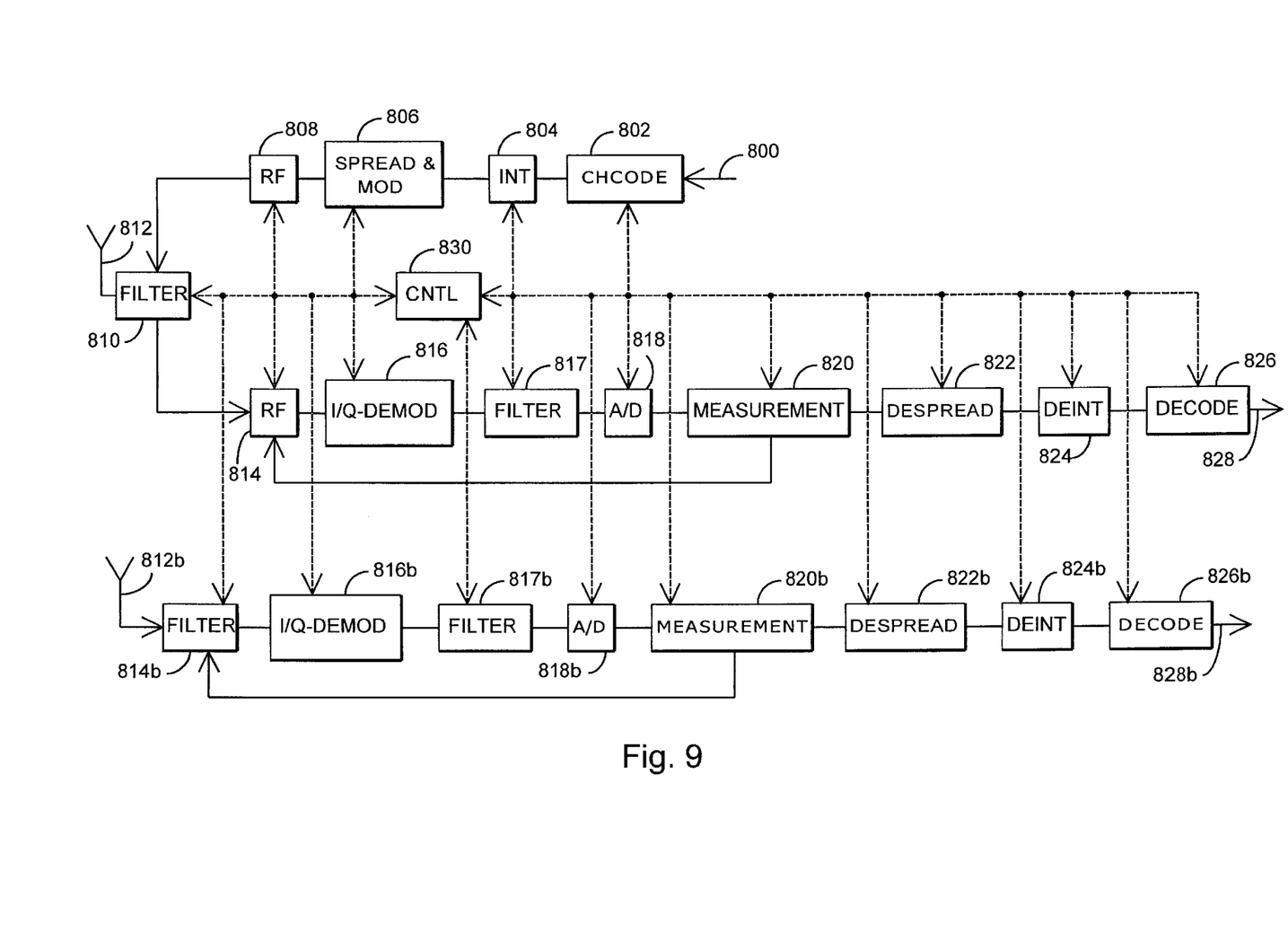
FIG. 9 illustrates a second example of a terminal equipment in a system according to the invention.

FIG. 9 shows another example of the structure of a terminal equipment according to the invention. In this example, too, the structure is simplified and it only shows the essential blocks, as it is evident for a person skilled in the art.

Examine first the structure of the transmitting end. The structure is similar to the one shown in FIG. 8. Like reference numerals refer to like parts in the figures.

At the receiving end, the terminal equipment comprises a parallel receiver which is implemented as described above, in other words it comprises components 812b–826b corresponding to the parts 812–826 described above. The terminal equipment uses the parallel receiver chain to enable diversity reception, which means receiving a signal from the terminal equipment's own base station with more than one receiver, which provides better connection quality than reception with only one receiver. In the arrangement according to the invention, the other receiver can be used for adjacent channel measurements, if necessary.

When adjacent channel measurement is to be activated, the base station BTS1 transmits to the terminal equipment MS11 a measurement activation command comprising data about the frequency the terminal equipment should measure and about the desired frequency of measurement. It is also possible to signal to the terminal equipment data about the threshold values, as described above. Instead of changing to the compressed data transmission mode during the measurements, as described above, the terminal equipment performs the measurements in this alternative by means of the diversity receiver at desired intervals. When no measurements are carried out, the receiver can be used normally for diversity reception. In a preferred embodiment of the invention, the measurement interval is adjusted on the basis of the measurement results, as described above.

Even though the invention is described above with reference to an example according to the accompanying drawings, it is clear that the invention is not restricted thereto but it can be modified in several ways within the scope of the inventive idea disclosed in the appended claims.

We claim:

1. A method of timing an interfrequency handover in a WCDMA cellular radio system, wherein data transmission between terminal equipment and a base station employs several adjacent alternative frequency bands and which system comprises several different base stations the coverage areas of which overlap at least partly, and which base stations utilize frequency band groups that differ from one another and that are situated next to one another in the frequency range, said method comprising the steps of:

communicating from the terminal equipment with a first base station on a first frequency band;

measuring the strength of a first signal received from the first base station by a terminal equipment receiver at the terminal equipment;

measuring at the terminal equipment the strength of a second signal transmitted by a second base station on a second, adjacent frequency band and received by the terminal equipment receiver;

comparing the measurement results of the first and the second signal, and if the second signal exceeds the first signal by a given threshold value, signalling from the terminal equipment a handover request to the first base station, and wherein the given threshold value is equal to or less than the maximum value for the adjacent channel interference of the terminal equipment receiver.

2. A method according to claim 1, wherein the system employs compressed data transmission mode to enable signal measurements at given intervals, and the terminal equipment requests the first base station to adjust the measurement intervals on the basis of the comparison of the measurement results of the first and the second signals.

3. A method according to claim 1, wherein the terminal equipment receives a signal from the first base station with more than one terminal equipment receiver, and in order to enable signal measurements, one terminal equipment receiver is guided to perform measurements at given intervals, and the terminal equipment requests the first base station to adjust the measurement intervals on the basis of the comparison of the measurement results of the first and the second signals.

4. A method according to claim 2, wherein the terminal equipment requests the first base station to increase the number of measurements per time unit when the strength of the second signal exceeds a certain threshold.

5. A method according to claim 2, wherein the terminal equipment requests the first base station to increase the number of measurements per time unit when the strength of the second signal equals the strength of the first signal.

6. A method according to claim 1, wherein after the first base station has received a handover request from the terminal equipment, said first base station activates a handover operation in order to change the connection of the terminal equipment to another frequency used by the first base station.

7. A method according to claim 1, wherein there are several operators in the system, and the first and the second base stations are stations of different operators.

8. A method according to claim 1, wherein the first base station services a macrocell and the second base station services a microcell situated within the coverage area of the first base station.

9. A cellular radio system which utilizes the WCDMA method, and wherein data transmission between terminal equipment and base stations in the system employs several adjacent alternative frequency bands, wherein said system comprises:

several different base stations the coverage areas of which overlap at least partly, and which base stations utilize frequency band groups that differ from one another and are situated next to one another in the frequency range;

terminal equipment communicating with a first base station by a first signal on a first frequency band and measuring the strength of said first signal and a second signal transmitted by a second base station on a second, adjacent frequency band, and wherein the terminal equipment comprises:

a terminal equipment receiver for receiving said first signal and said second signal;

means for comparing the measurement results of the first and the second signals received by the terminal equipment receiver; and means for deciding on the transmission of a handover request to the first base station if the second signal exceeds the first signal by a given threshold value which is equal to or less than the maximum value for the adjacent channel interference of the terminal equipment receiver.

10. A system according to claim 9, which system employs a compressed data transmission mode to enable signal measurements at given intervals, and wherein the terminal equipment further comprises means for requesting the first base station to adjust the measurement intervals on the basis of comparison of the measurement results of the first and second signals.

11. A system according to claim 9, wherein the terminal equipment further comprises at least one parallel receiver for enabling diversity reception, and means for measuring the strength of a second signal transmitted on a second, adjacent frequency band at given intervals.

12. A system according to claim 10, wherein the terminal equipment further comprises means for requesting the first base station to increase the number of measurements per time unit when the strength of the second signal exceeds a certain threshold.

13. A system according to claim 9, wherein the first base station comprises means, responsive to the receipt of a handover request from the terminal equipment, for activating a handover operation in order to change the connection of the terminal equipment to another frequency used by the first base station.

14. A system according to claim 9, further comprising several operators, and wherein the first and the second base stations are stations of different operators.

15. A system according to claim 9, wherein the first base station services a macrocell and the second base station services a microcell situated within a coverage area of the first base station.

* * * * *